(12) United States Patent
Ichiki et al.

(10) Patent No.: US 6,423,283 B1
(45) Date of Patent: *Jul. 23, 2002

(54) METHOD FOR REMOVING NOX

(75) Inventors: Masayoshi Ichiki; Masaki Akiyama; Atsushi Fukuju, all of Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/623,797

(22) Filed: Sep. 8, 2000

(51) Int. Cl.$^7$ .................................................. B01J 8/00
(52) U.S. Cl. ..................................... 423/239.1; 423/351
(58) Field of Search ................................ 423/239.1, 351

(56) References Cited

U.S. PATENT DOCUMENTS

| | | | | |
|---|---|---|---|---|
| 3,977,836 A | * | 8/1976 | Matsuda et al. | 23/232 R |
| 4,001,371 A | * | 1/1977 | Remeika et al. | 423/213.2 |
| 4,053,556 A | * | 10/1977 | Acres | 423/239 |
| 4,131,432 A | * | 12/1978 | Sato et al. | 422/177 |
| 5,002,741 A | * | 3/1991 | Hooper | 423/239 |

FOREIGN PATENT DOCUMENTS

| | | |
|---|---|---|
| JP | 54158372 A | 12/1979 |
| JP | 56037029 A | 4/1981 |
| JP | 62163731 A | 7/1987 |
| JP | 03077624 A | 4/1991 |
| JP | 03267116 | 11/1991 |
| JP | 10-085560 | 4/1998 |

OTHER PUBLICATIONS

International Search Report dated Jun. 9, 1998.

* cited by examiner

Primary Examiner—Steven P. Griffin
Assistant Examiner—Edward M. Johnson
(74) Attorney, Agent, or Firm—Armstrong, Westerman & Hattori, LLP

(57) ABSTRACT

The invention provides a process for removing NOx which is free of impairment in denitration efficiency at a reaction temperature of up to 300° C. even when the component molar ratio of NOx in the gas to be treated is $NO_2>NO$. For use in removing NOx from the gas to be treated and containing $NO_2$ in a larger amount than NO, that is, having a $(NO_2)$/NOx ratio in excess of 0.5, by selective reduction with use of ammonia serving as a main reducing agent in the presence of a denitration catalyst, the process of the invention for removing NOx comprises adding to the denitration reaction system a substance for removing an excess of oxygen accumulating on catalyst active sites by selectively reducing the oxygen at not higher than 300° C., for example, at 300 to 150° C., in other words, a substance which reacts with the excess of oxygen on the catalyst active sites and becomes oxidized at not higher than 300° C.

15 Claims, 3 Drawing Sheets

Influence of NO/NOx Ratio on Reaction Property of $NO-NO_2-NH_3$ at 250°C

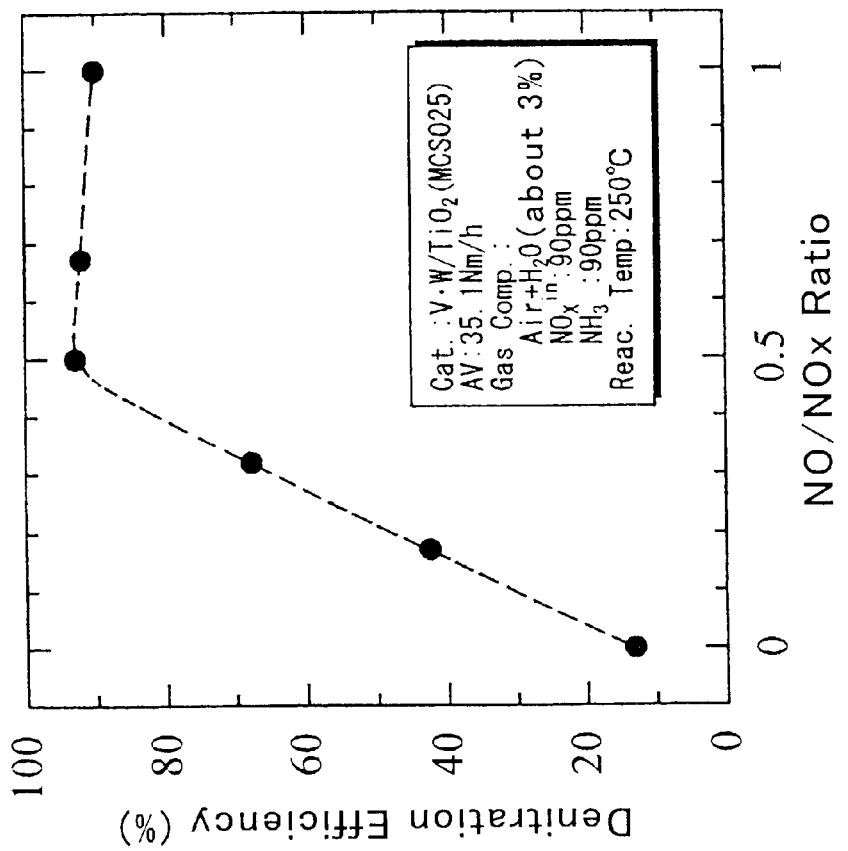

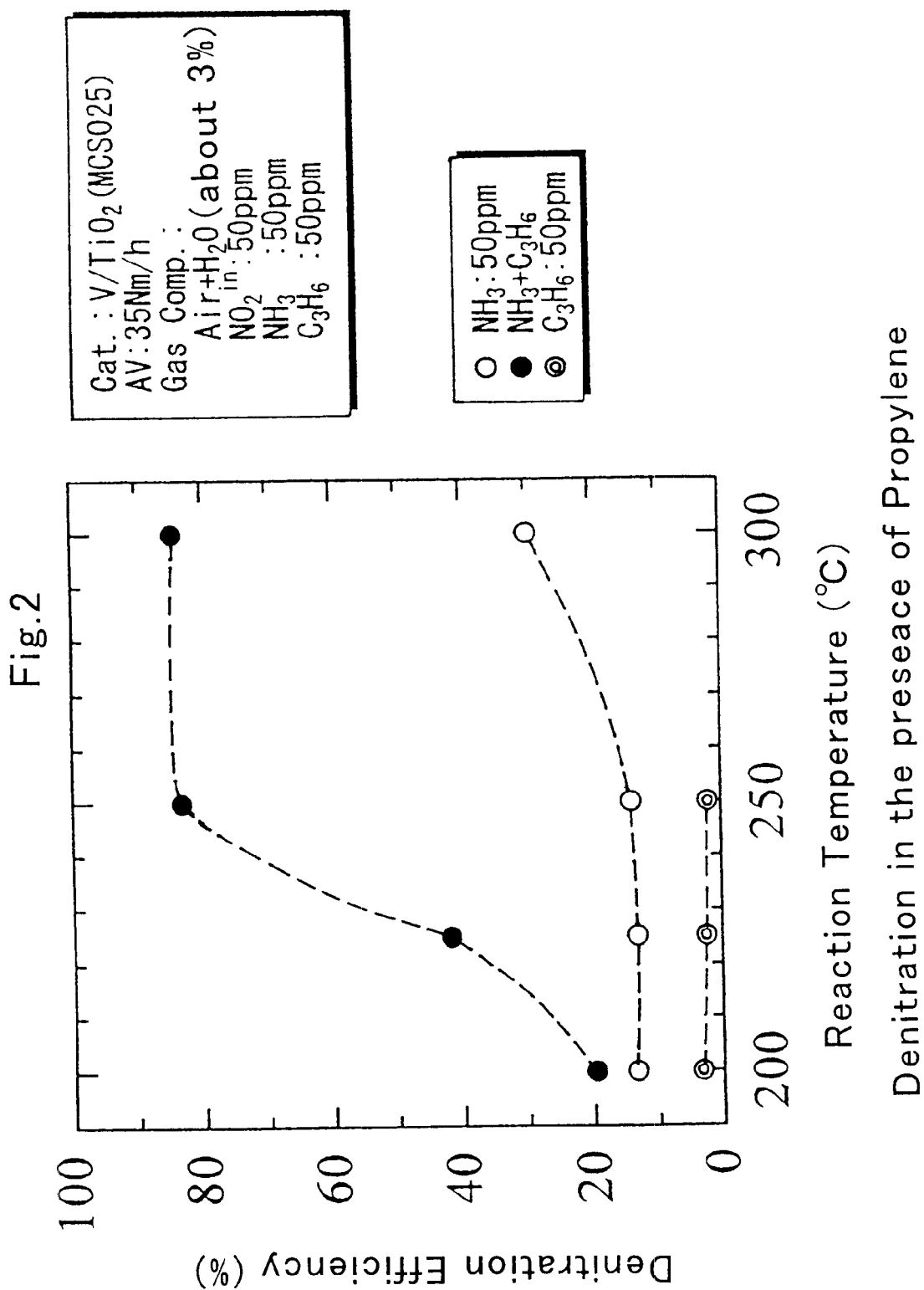

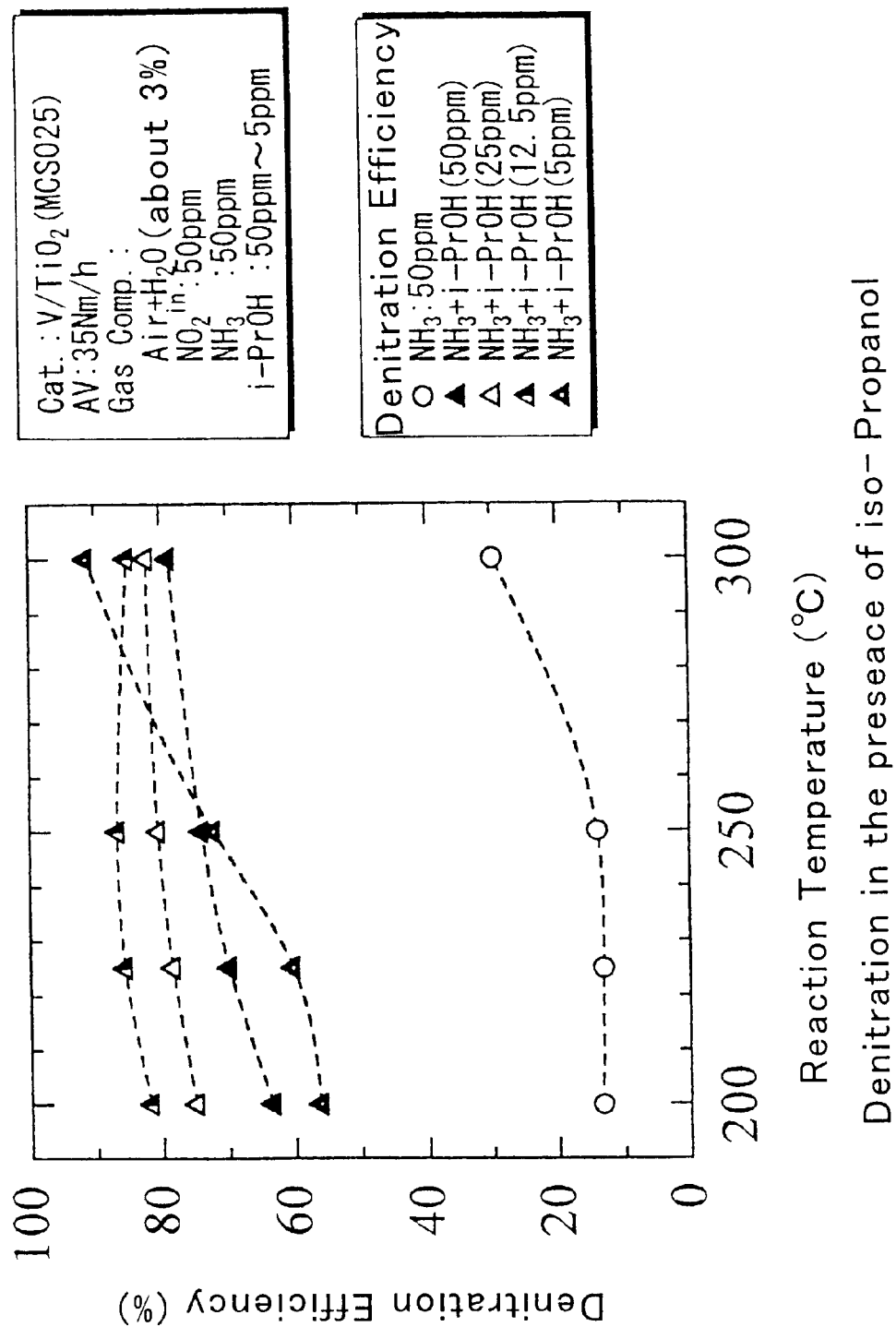

METHOD FOR REMOVING NOX

TECHNICAL FIELD

The present invention relates to a process for removing nitrogen oxides (NOx), and more particularly to a process for removing NOx by selective reduction from gases having a low temperature (e.g., of up to 300° C.) and a nitrogen dioxide ($NO_2$)/NOx ratio in excess of 0.5, such as combustion exhaust gases produced in starting up gas turbines, regeneration exhaust gases containing removed NOx and resulting from the regeneration of NOx adsorbents by heating, and process exhaust gases in various modes of chemistry of nitric acid.

BACKGROUND ART

It is conventional practice to use a vanadium-tungsten supporting titania catalyst and a reducing agent, such as ammonia or urea, for reducing and decomposing NO and/$NO_2$ in the gas to be treated for the removal of NOx.

However, this denitration process has the problem that the catalytic activity is lower when the component molar ratio of NOx in the gas to be treated is $NO_2>NO$ than when the ratio is $NO_2 \leq NO$ as will be described below.

FIG. 1 shows the relationship between the NO/NOx ratio and the denitration efficiency.
Denitration conditions:
  Areal velocity (AV) 35 $Nm^3/m^2 \cdot h$
  Composition of the gas to be treated
    Air+$H_2O$ (about 3%)
    NOx 90 ppm
    $NH_3$ 90 ppm
  Reaction temperature 250° C.

The graph shows that the denitration efficiency becomes maximum when the NO/NOx ratio is 0.5 (No:$No_2$=1:1) and lowers as the NO/NOx ratio decreases from 0.5. One of the causes of the reduction in the catalytic activity is thought attributable to a diminution in $NH_3$ adsorption sites due to an excess of oxygen on the catalyst active sites as will be described below.
1) In the case of removal of NO

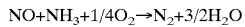
$$NO+NH_3+1/4O_2 \rightarrow N_2+3/2H_2O$$

Although the catalyst active sites are reduced to result in a deficiency of oxygen, the active sites are reoxidized with the oxygen in the gas to be treated and are thereby replenished with oxygen. If the reaction temperature has a low value of up to 200° C., difficulty is encountered in oxidizing the catalyst with this gaseous-phase oxygen to result in markedly impaired denitrating properties.
2) In the case of removal of $NO_2$

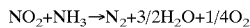
$$NO_2+NH_3 \rightarrow N_2+3/2H_2O+1/4O_2$$

When the gas to be treated contains oxygen in a high concentration, the oxygen produced on the catalyst active sites is not readily releasable into the gaseous phase. An excess of oxygen on the catalyst active sites therefore inhibits the adsorption of ammonia, consequently impairing the denitrating properties of the catalyst.
3) In the case of denitration of NO+$NO_2$ (1:1 in molar ratio)

$$NO+NO_2+2NH_3 \rightarrow 2N_2+3H_2O$$

There is no excess or deficiency of oxygen, permitting the catalyst to exhibit the highest denitrating properties.

An object of the present invention is to provide a process for removing NOx which is free of impairment in denitration efficiency at a reaction temperature of up to 300° C. even when the component molar ratio of NOx in the gas to be treated is $NO_2>NO$.

DISCLOSURE OF THE INVENTION

In removing NOx from the gas to be treated and containing $NO_2$ in a larger amount than NO, that is, having a ($NO_2$)/NOx ratio in excess of 0.5, by selective reduction with use of ammonia serving as a main reducing agent in the presence of a denitration catalyst, a process for removing NOx which is characterized by adding to the denitration reaction system a substance for removing an excess of oxygen accumulating on catalyst active sites by selectively reducing the oxygen at not higher than 300° C., for example, at 300 to 150° C., in other words, a substance which reacts with the excess of oxygen on the catalyst active sites and becomes oxidized at not higher than 300° C. (the substance will be referred to as an "auxiliary reducing agent").

The auxiliary reducing agent is a substance which reacts with the excess of oxygen on the catalyst active sites and becomes oxidized at not higher than 300° C., irrespective of gaseous-phase oxygen. Preferably, the agent is an organic compound.

It is desired that the auxiliary reducing agent or a liquid containing the agent (e.g., aqueous solution, to be used in the same meaning hereinafter) be present in the form of a vapor or gas before reaching the denitration catalyst, as uniformly diffused. Accordingly, it is desired to introduce the auxiliary reducing agent into the system, for example, by:
  injecting the agent or the liquid containing the agent directly into the flow of gas to be treated, or
  injecting the agent or the liquid containing the agent into a stream of air for diluting ammonia as the main reducing agent and forcing the agent or liquid into the flow of gas to be treated along with the ammonia.

In the case where the auxiliary reducing agent is a liquid, the amount of injection may be controlled by feeding the agent or the liquid containing the agent to the NOx removal apparatus by a metering pump, detecting the concentration of NOx (NO, $NO_2$) at the inlet of the apparatus, and controlling the pump with the resulting detection signal so as to alter the operating conditions such as the stroke, pitch, etc. of the pump.

When the auxiliary reducing agent or the liquid containing the agent is injected into the ammonia diluting air stream, it is likely that the agent or liquid will not be evaporated completely. It is then desirable to preheat the ammonia diluting air before the agent or liquid is injected. Instead of preheating the ammonia diluting air, it is also desirable to admix a portion of the gas of high temperature to be treated with the ammonia diluting air.

Aqueous ammonia or aqueous solution of urea is also usable as the ammonia supply source. In this case, it is desired to dissolve the auxiliary reducing agent in the aqueous solution first to add the agent and $NH_3$ to the denitration reaction system at the same time.

The auxiliary reducing agent is a substance which is not oxidized with gaseous-phase oxygen at a low temperature (up to 300° C.) but selectively reacts with an excess of oxygen on the catalyst active sites.

The preferred auxiliary reducing agents include hydrocarbons and alcohols.

Examples of hydrocarbons are lower alkanes having 1 to 10 carbon atoms, such as ethane, propane, butane, pentane and hexane; lower alkenes having 2 to 10 carbon atoms, such as ethylene, propylene, butene, pentene and hexene;

and saturated or unsaturated hydrocarbons such as derivatives of these compounds.

Alcohols are useful insofar as they are compounds having one or at least two hydroxyl groups. Examples of these alcohols are primary alcohols, secondary alcohols or tertiary alcohols having 1 to 10 carbon atoms, such as methanol, ethanol, propanol, butanol, pentanol and hexanol; and alcohols such as derivatives of these alcohols. Useful alcohols may be monohydric alcohols, dihydric alcohols or polyhydric alcohols. Aromatic alcohols are also usable. Especially desirable are monohydric alcohols having 1 to 10 carbon atoms.

It is desired that the amount of the auxiliary reducing agent to be injected be as small as possible in view of the occurrence of unreacted substances and formation of by-products. Stated more specifically, the useful amount of injection is at least an amount capable of consuming by an oxidation reaction ½ mole of excessive oxygen to be produced when 1 mole of nitrogen dioxide ($NO_2$) is removed. Further in the presence of nitrogen monoxide (NO), ½ mole of excessive oxygen is consumed by 1 mole of NO, so that the amount of the auxiliary reducing agent to be injected is not smaller than is capable of consuming the excessive oxygen resulting from the difference of [amount of $NO_2$–amount of NO]. For example, in the case where isopropanol is used as the auxiliary reducing agent and when the component molar ratio (NO/NOx)=0 (i.e., $NO_2$ only), the amount is preferably at least ⅙ mole to not greater than ½ mole per mole of $NO_2$. When the component molar ratio is in the range of 0>(NO/NOx)<0.5 in this case, the amount is preferably up to ⅙ mole per mole of $NO_2$.

The preferred amount of the auxiliary reducing agent to be injected is not smaller than the stoichiometric amount required for consuming the excessive oxygen to be produced by the reaction between $NO_2$ and ammonia to not greater than the amount of NOx.

When an excess of the auxiliary reducing agent is injected, the excessive oxygen is removed from the catalyst active sites rapidly to give higher denitrating properties to the catalyst, whereas if used in an amount larger than the amount of $NO_2$ in NOx (=NO+$NO_2$), the agent will reduce the catalyst active sites to excess and is likely impair the denitrating properties (especially the NO removing property) of the catalyst.

The denitration catalyst may be one enhanced in oxidizing ability so as to readily oxidize the auxiliary reducing agent, and is not limited specifically. Examples of preferred catalysts include a titania catalyst having vanadium supported thereon.

Ammonia undergoes an equimolar reaction with NO or $NO_2$ and is therefore injected in an amount calculated from: (amount of NOx at inlet)×(required denitration efficiency)+ (allowable amount of leak ammonia). Thus, the amount of ammonia to be injected is dependent on the amount of NOx to be removed and is not always limited to the foregoing range.

In removing $NO_2$ from the gas to be treated by selective catalytic reduction with use of $NH_3$ serving as a main reducing agent, the equilibrium relation of $NO_2$=NO+1/2$O_2$ produces NO in the case where the denitration reaction temperature is high (in excess of 300° C.). Furthermore, the combustion of ammonia in this case also produces NO through the reaction of:

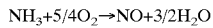

These portions of NO produced consume the excessive oxygen on the catalyst active sites. Accordingly, the nitrating properties will not be impaired greatly even when the component molar ratio is $NO_2$>NO.

In the case where the denitration reaction temperature is low (up to 300° C.), on the other hand, formation of NO is almost unexpectable, so that an excess of oxygen inhibiting the adsorption of ammonia is produced on the catalyst active sites in removing $NO_2$.

According to the process of the present invention, an auxiliary reducing agent is used which is a substance to be oxidized with the excess of oxygen on the catalyst active sites at not higher than 300° C., so that when the NOx in the gas of low temperature to be treated is in the range of $NO_2$>NO in component molar ratio, the excessive oxygen produced on the catalyst active sites is consumed for the oxidation of the auxiliary reducing agent, consequently obviating the likelihood that the excessive oxygen will inhibit the adsorption of ammonia by the active sites. This ensures ammonia adsorption on the catalysts active sites.

BRIEF DESCRIPTION OF THE DRAWINGS

FIG. 1 is a graph showing the relationship between the NO/NOx ratio and the denitration efficiency as determined for the conventional denitration process.

FIG. 2 is a graph showing the denitration efficiencies achieved by practicing the present invention with use of propylene as the auxiliary reducing agent and by a comparative process.

FIG. 3 is a graph showing the denitration efficiencies achieved by practicing the present invention with use of 2-propanol as the auxiliary reducing agent and by a comparative process.

BEST MODE OF CARRYING OUT THE INVENTION

Examples of the invention will be described next.

1. Preparation of Catalyst

Ceramic paper ("MCS025," product of Nippon Musen Co., Ltd., 0.25 mm in thickness) of ceramic fibers was impregnated with, and caused to support thereon, a titania colloidal solution (32 wt. % in solids content) obtained by the nitrate hydrolysis process, then dried at 110° C. for 1 hour and thereafter baked at 400° C. for 3 hours to obtain a platelike support having 90 g/m² of titania of the anatase type held thereto.

The platelike support was dipped in a saturated aqueous solution of ammonium metavanadate (room temperature) and then dried at 200° C. for 30 minutes. This procedure was repeated once again, and the dried product obtained was thereafter baked at 400° C. for 1 hour to obtain a platelike titania catalyst having vanadium supported thereon.

2. Removal of NOx Using Hydrocarbon as Auxiliary Reducing Agent

EXAMPLE 1

A gas was treated under the following conditions for the removal of NOx with use of the vanadium-supporting titania catalyst as a denitration catalyst by feeding ammonia as a main reducing agent and propylene as an auxiliary reducing agent at the same time to a denitration reaction system. (The main and auxiliary reducing agents were fed in amounts equal to the amount of NOx.)

Denitration conditions:
  Areal velocity (AV) 35 Nm³/m²·h
  Composition of the gas to be treated
    Air+H₂O (about 3%)
    NO₂ 50 ppm
    NH₃ 50 ppm
    Propylene 50 ppm
  Reaction temperature 200–300° C.

Comparative Examples 1 and 2

The same procedure as in Example 1 was repeated for the removal of NOx with the exception of using ammonia only as a main reducing agent without using any auxiliary reducing agent (Comparative Example 1), or using propylene only without using any main reducing agent (Comparative Example 2).

FIG. 2 shows the relationship between the reaction temperature included in the foregoing denitration conditions and the denitration efficiency, as established by the denitration operations of Example 1 and Comparative Examples 1 and 2.

FIG. 2 reveals that Example 1 wherein ammonia serving as the main reducing agent and propylene serving as the auxiliary reducing agent were used at the same time achieved a higher NOx removal efficiency at reaction temperatures of up to 300° C. than Comparative Example 1 wherein ammonia only was used.

Comparative Example 2 wherein propylene alone was used as the reducing agent was almost ineffective for removing NOx. This indicates that propylene functions merely as an auxiliary reducing agent for consuming the excessive oxygen on the catalyst active sites, further showing that ammonia serves as a reducing agent for the removal of NOx.

3) Removal of NOx Using Alcohol as Auxiliary Reducing Agent

EXAMPLES 2–5

A gas was treated under the following conditions for the removal of NOx with use of the vanadium-supporting titania catalyst as a denitration catalyst by simultaneously feeding to a denitration reaction system ammonia as a main reducing agent in an amount equal to the amount of NOx and isopropanol as an auxiliary reducing agent in an amount which was gradually decreased from an amount equal to the amount of NOx for the different examples.

Denitration conditions:
  Areal velocity (AV) 35 Nm³/m²·h
  Composition of the gas to be treated
    Air+H₂O (about 3%)
    NO₂ 50 ppm
    NH₃ 50 ppm
    Isopropanol 5–50 ppm
  Reaction temperature 200–300° C.

To give the isopropanol a concentration of 5 ppm (Example 2), 12.5 ppm (Example 3), 25 ppm (Example 4) or 50 ppm (Example 5), the isopropanol was used in the form of an aqueous solution of specified concentration, as heated for vaporization by being injected at a constant rate into the gas to be treated, and fed to the denitration reaction system along with the ammonia serving as the main reducing agent.

FIG. 3 shows the relationship between the reaction temperature included in the foregoing denitration conditions and the denitration efficiency, as established by the denitration operations of Examples 2 to 5 and Comparative Example 1.

FIG. 3 reveals that Examples 2 to 5 wherein isopropanol was used as the auxiliary reducing agent along with ammonia serving as the main reducing agent achieved a higher NOx removal efficiency than Comparative Example 1 wherein ammonia only was used. Furthermore, Examples 2 to 5 wherein isopropanol was used as the auxiliary reducing agent attained a higher NOx removal efficiency in the low temperature range of 200 to 250° C. than Example 1 wherein propylene was used as the auxiliary reducing agent.

It is also understood that a higher NOx removal efficiency is achieved when the isopropanol serving as the auxiliary reducing agent is used in an amount somewhat smaller than the amount equal to the amount of NOx.

Isopropanol is more easily oxidized than propylene. When isopropanol is injected in an excessive amount, the catalyst active sites are reduced to excess, or the isopropanol remaining unreacted is adsorbed by the catalyst active sites, presumably leading to a tendency toward inhibited adsorption of ammonia to result in a lower denitration efficiency.

2-Propanol undergoes the oxidation reaction of:

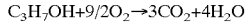

$$C_3H_7OH + 9/2 O_2 \rightarrow 3CO_2 + 4H_2O$$

It is seen that if the whole amount of isopropanol is oxidized completely, the amount of isopropanol required to consume ½ mole of excessive oxygen to be produced in removing 1 mole of NO₂ is ⅑ mole. Further when NO is present in NOx, ½ mole of excessive oxygen is consumed when 1 mole of NO is removed, so that the amount of isopropanol to be injected is up to ⅑ mole per mole of NO₂ to obtain a satisfactory result.

INDUSTRIAL APPLICABILITY

The present invention is advantageously applicable to a process for removing NOx by selective reduction from gases having a low temperature (e.g., of up to 300° C.) and a nitrogen dioxide (NO₂)/NOx ratio in excess of 0.5, such as combustion exhaust gases produced in starting up gas turbines, regeneration exhaust gases containing removed NOx and resulting from the regeneration of NOx adsorbents by heating, and process exhaust gases in various modes of chemistry of nitric acid.

What is claimed is:

1. In removing NOx from a gas to be treated and containing NO₂ in a larger amount than NO by selectively reducing NOx with using ammonia serving as a main reducing agent in the presence of a denitration catalyst in a denitration system, a process of removing NOx comprising adding a substance to the denitration reaction system as an auxiliary reducing agent, the substance for removing an excess of oxygen accumulating on catalyst active sites by selectively reducing oxygen at not higher than 300° C.

2. A process for removing NOx according to claim 1 which is characterized by injecting the auxiliary reducing agent or a liquid containing the auxiliary agent directly into a flow of the gas to be treated.

3. A process for removing NOx according to claim 2 comprising feeding the auxiliary reducing agent or the liquid containing the auxiliary reducing agent to an apparatus for removing NOx by a metering pump, detecting the concentration of NOx at an inlet of the apparatus and producing a detecting signal, and controlling the operation of the metering pump with the detection signal.

4. A process for removing NOx according to claim 2 wherein air for diluting the ammonia is preheated before the auxiliary reducing agent or a liquid containing the auxiliary agent is injected into the air for diluting the ammonia.

5. A process for removing NOx according to claim 1 which is characterized in that the auxiliary reducing agent or a liquid containing the auxiliary agent is forced into a stream of air for diluting the ammonia serving as the main reducing agent and injected into a flow of the gas to be treated along with the ammonia.

6. A process for removing NOx according to claim 5 comprising feeding the auxiliary reducing agent or the liquid containing the auxiliary reducing agent to an apparatus for removing NOx by a metering pump, detecting the concentration of NOx at an inlet of the apparatus and producing a detecting signal, and controlling the operation of the metering pump with the detection signal.

7. A process for removing NOx according to claim 1 wherein a portion of the gas to be treated at a high temperature is admixed with air for diluting the ammonia before the auxiliary reducing agent or a liquid containing the auxiliary agent is injected into the air.

8. A process for removing NOx according to claim 1 comprising using aqueous ammonia or an aqueous solution of urea as a supply source for the ammonia and dissolving the auxiliary reducing agent in the aqueous solution before the auxiliary agent is added to the denitration reaction system.

9. A process for removing NOx according to claim 1, wherein the auxiliary reducing agent is a hydrocarbon.

10. A process for removing NOx according to claim 9 wherein the hydrocarbon is an alkane having 2 to 10 carbon atoms.

11. A process for removing NOx according to claim 9 wherein the hydrocarbon is an alkene having 2 to 10 carbon atoms.

12. A process for removing NOx according to claim 1 wherein the auxiliary reducing agent is an alcohol.

13. A process for removing NOx according to claim 12 wherein the alcohol is a monohydric alcohol having 1 to 10 carbon atoms.

14. A process for removing NOx according to claim 1 wherein the amount of the auxiliary reducing agent to be injected is not smaller than a stoichiometric amount required for consuming an excess of oxygen to be produced by the reaction between the $NO_2$ and the ammonia to not greater than the NOx contained in the gas to be treated.

15. A process for removing NOx according to claim 1 wherein the denitration catalyst is a titania catalyst having vanadium supported thereon.

* * * * *